(12) United States Patent
Abu Alhaol et al.

(10) Patent No.: US 11,574,054 B2
(45) Date of Patent: Feb. 7, 2023

(54) SYSTEM, METHOD AND APPARATUS FOR MALICIOUS SOFTWARE DETECTION

(71) Applicant: HUAWEI TECHNOLOGIES CO., LTD., Guangdong (CN)

(72) Inventors: Ibrahim Yakub Abu Alhaol, Ottawa (CA); Ronnie Salvador Giagone, Burnaby (CA); Yang Zhou, Burnaby (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 311 days.

(21) Appl. No.: 17/093,882

(22) Filed: Nov. 10, 2020

(65) Prior Publication Data

US 2022/0147628 A1    May 12, 2022

(51) Int. Cl.
*G06F 21/56* (2013.01)
*G06N 3/04* (2006.01)
*G06N 3/08* (2006.01)

(52) U.S. Cl.
CPC .......... *G06F 21/564* (2013.01); *G06F 21/568* (2013.01); *G06N 3/04* (2013.01); *G06N 3/08* (2013.01); *G06F 2221/033* (2013.01)

(58) Field of Classification Search
CPC .................. G06F 21/564; G06F 21/568; G06F 2221/033; G06F 21/562; G06F 21/56; G06N 3/04; G06N 3/08; G06N 3/0454
See application file for complete search history.

(56) References Cited

U.S. PATENT DOCUMENTS

| | | |
|---|---|---|
| 3,955,120 A | 5/1976 | Jurgensen et al. |
| 9,942,264 B1 | 4/2018 | Kennedy et al. |
| 10,230,749 B1 | 3/2019 | Rostami-Hesarsorkh et al. |
| 10,303,875 B1 | 5/2019 | Saxe et al. |
| 10,437,996 B1 * | 10/2019 | Li .......................... G06F 16/245 |

(Continued)

FOREIGN PATENT DOCUMENTS

| | | |
|---|---|---|
| EP | 2189920 A2 | 5/2010 |
| WO | 2017151515 A1 | 9/2017 |

OTHER PUBLICATIONS

Ucci et al., Survey of machine learning techniques for malware analysis, 2018, Computers & Security.

(Continued)

*Primary Examiner* — Quazi Farooqui
(74) *Attorney, Agent, or Firm* — BCF LLP

(57) ABSTRACT

The disclosed systems and methods are directed to a method for malicious software detection comprising: recognizing and extracting an EP section in an unrecognized PE file, collecting bytes in the EP section of the unrecognized PE file, converting the bytes to an array of integers, generating one or more n-grams from the array of integers, converting the one or more n-grams into b-MinHash, converting the bytes in an EP function included in the EP section to an array of assembly-based mnemonics; generating one or more n-grams from the array of assembly-based mnemonics and converting the one or more n-grams from the array of assembly-based mnemonics into a-MinHash, generating a similarity matrices, converting, the similarity matrices into a lower dimensionality code representation, and classifying the code as a PE benign or a malware file.

20 Claims, 18 Drawing Sheets

(56) References Cited

U.S. PATENT DOCUMENTS

| | | | |
|---|---|---|---|
| 2017/0251003 | A1 | 8/2017 | Rostami-Hesarsorkh et al. |
| 2018/0293381 | A1 | 10/2018 | Tseng et al. |
| 2019/0026466 | A1 | 1/2019 | Sven et al. |
| 2019/0199736 | A1 | 6/2019 | Howard et al. |
| 2021/0141897 | A1* | 5/2021 | Seifert ............... H04L 63/1408 |

OTHER PUBLICATIONS

Ahmadi et al., Novel feature extraction, selection and fusion for effective malware family classification, Mar. 2016, InProceedings of the sixth ACM conference on data and application security and privacy, pp. 183-194.

Raff et al., Malware detection by eating a whole exe. InWorkshops at the Thirty-Second AAAI Conference on Artificial Intelligence, Jun. 2018.

Honig et al., Practical Malware Analysis, Feb. 2012.

Lu, Malware Detection with LSTM using Opcode Language, 2019, arXivpreprint arXiv:1906.04593.

You et al., Malware obfuscation techniques: A brief survey, Nov. 2010, In 2010 IEEE International conference on broadband, wireless computing, communication and applications, pp. 297-300.

Sen, Advances in Security in Computing and Communications, InTech, 2017.

Anderson et al., Learning to evade static PE machine learning malware models via reinforcement learning, 2018.

Anderson et al., Evading machine learning malware detection, Black Hat, 2017.

Rad et al., "Camouflage in malware: from encryption to metamorphism", International Journal of Computer Science and Network Security, vol. 12, No. 8 (2012), pp. 74-83.

Ye et al., A survey on malware detection using data mining techniques.ACM Computing Surveys (CSUR), Jun. 2017, 50(3), pp. 1-40.

Security Ninja, Complete Tour of PE and ELF: Data Structures, Mar. 15, 2016, retrieved from https://resources.infosecinstitute.com/topic/complete-tour-of-pe-and-elf-part-2/ on Nov. 6, 2020.

Github, Radareorg/radare2:"UNIX-like reverse engineering framework and command-line toolset", retrieved from https://www.radare.org/n/radare2.html on Nov. 6, 2020.

Capstone, "lightweight multi-platform, multi-architecture disassembly framework", retrieved from http://www.capstone-engine.org/ on Nov. 6, 2020.

Sangani et al., "Machine Learning in Application Security" In Advances in Security in Computing and Communications. IntechOpen, 2017.

Eric Zhu, "MinHash LSH Forest", 2020, retrieved from http://ekzhu.com/datasketch/lshforest.html on Nov. 6, 2020.

Shabtai et al., Detection of malicious code by applying machine learning classifiers on static features: A state-of-the-art survey, 2009, Information security technical report, 14(1), pp. 16-29.

Santos et al, "Opcode Sequences as Representation of Executables for Data-mining-based Unknown Malware Detection", Aug. 22, 2011.

International Search Report and Written Opinion of PCT/CN2021/128293; Hu, Beibei; dated Jan. 28, 2022.

* cited by examiner

['mov', 'push', 'mov', 'push', 'mov', 'push', 'mov', 'test', 'push', 'mov', 'jne', 'cmp', 'jmp', 'cmp', 'je', 'cmp', 'jne', 'mov', 'test', 'je', 'push', 'push', 'push', 'call', 'test', 'jne', 'xor', 'jmp', 'push', 'push', 'push', 'call', 'cmp', 'mov', 'jne', 'test', 'jne', 'push', 'push', 'push', 'call', 'test', 'je', 'cmp', 'jne', 'push', 'push', 'push', 'call', 'test', 'jne', 'and', 'cmp', 'je', 'mov', 'test', 'je', 'push', 'push', 'call', 'mov', 'mov', 'pop', 'pop', 'pop', 'pop', 'ret']

```
def SimMatrix(forest,minhashes,UName,**params):
    num_results=params["num_results"]
    perms=params["perms"]
    results={}
    idx_1 = np.array(forest.query(MinHashOject, num_results))
    Sim=Jacaard_Sim(MinHashOject,idx_1,minhashes)
    Sim=np.array(Sim)
    idx_2=np.argsort(np.array(Sim))[::-1]
    idx_1=idx_1[idx_2]
    Sim=Sim[idx_2]
    results['Sim'+UName]=Sim
    Z1=Index_to_hashes(idx_1,minhashes)
    if len(Z1)<num_results:
        Z=np.zeros((num_results,perms))
        K=np.zeros((num_results))
        if len(Z1)>0:
            Z[:Z1.shape[0],:]=Z1
            Z1=Z
            k[:Sim.shape[0]]=Sim
            Sim=K
        else:
            Z1=Z
            Sim_mal_bytes=K
    Z1=Z1.astypes(int)
    results['Rep'+UName]=Z1
    return results
```

| Layer (type) | Output Shape | Param # |
|---|---|---|
| input_43 (InputLayer) | (None, 11, 128, 4) | 0 |
| batch_normalization_82 (Batc | (None, 11, 128, 4) | 16 |
| conv2d_45 (Conv2D) | (None, 11, 128, 128) | 2688 |
| max_pooling2d_24 (MaxPooling | (None, 6, 128, 128) | 0 |
| conv2d_46 (Conv2D) | (None, 6, 128, 128) | 82048 |
| max_pooling2d_25 (MaxPooling | (None, 2, 128, 128) | 0 |
| conv2d_47 (Conv2D) | (None, 1, 128, 128) | 82048 |
| max_pooling2d_26 (MaxPooling | (None, 1, 128, 128) | 0 |
| flatten_80 (Flatten) | (None, 16384) | 0 |
| batch_normalization_83 (Batch) | (None, 16384) | 65536 |
| dense_475 (Dense) | (None, 64) | 1048640 |
| dropout_421 (Dropout) | (None, 64) | 0 |
| dense_476 (Dense) | (None, 32) | 2080 |
| dropout_422 (Dropout) | (None, 32) | 0 |
| dense_477 (Dense) | (None, 8) | 264 |
| dropout_423 (Dropout) | (None, 8) | 0 |
| dense_478 (Dense) | (None, 4) | 36 |
| dropout_424 (Dropout) | (None, 4) | 0 |
| dense_479 (Dense) | (None, 2) | 10 |

Total params: 1,283,366
Trainable params: 1,250,590
Non-trainable params: 32,766

| Layer (type) | Output Shape | Param # |
|---|---|---|
| flatten_5 (Flatten) | (None, 256) | 0 |
| batch_normalization_5 (Batch) | (None, 256) | 1024 |
| dense_29 (Dense) | (None, 256) | 65792 |
| dropout_25 (Dropout) | (None, 256) | 0 |
| dense_30 (Dense) | (None, 126) | 32382 |
| dropout_26 (Dropout) | (None, 126) | 0 |
| dense_31 (Dense) | (None, 64) | 8128 |
| dropout_27 (Dropout) | (None, 64) | 0 |
| dense_32 (Dense) | (None, 32) | 2080 |
| dropout_28 (Dropout) | (None, 32) | 0 |
| dense_33 (Dense) | (None, 16) | 528 |
| dropout_29 (Dropout) | (None, 16) | 0 |
| dense_34 (Dense) | (None, 8) | 136 |
| dropout_30 (Dropout) | (None, 8) | 0 |
| dense_35 (Dense) | (None, 2) | 18 |

Total params: 110,088
Trainable params: 109,576
Non-trainable params: 512

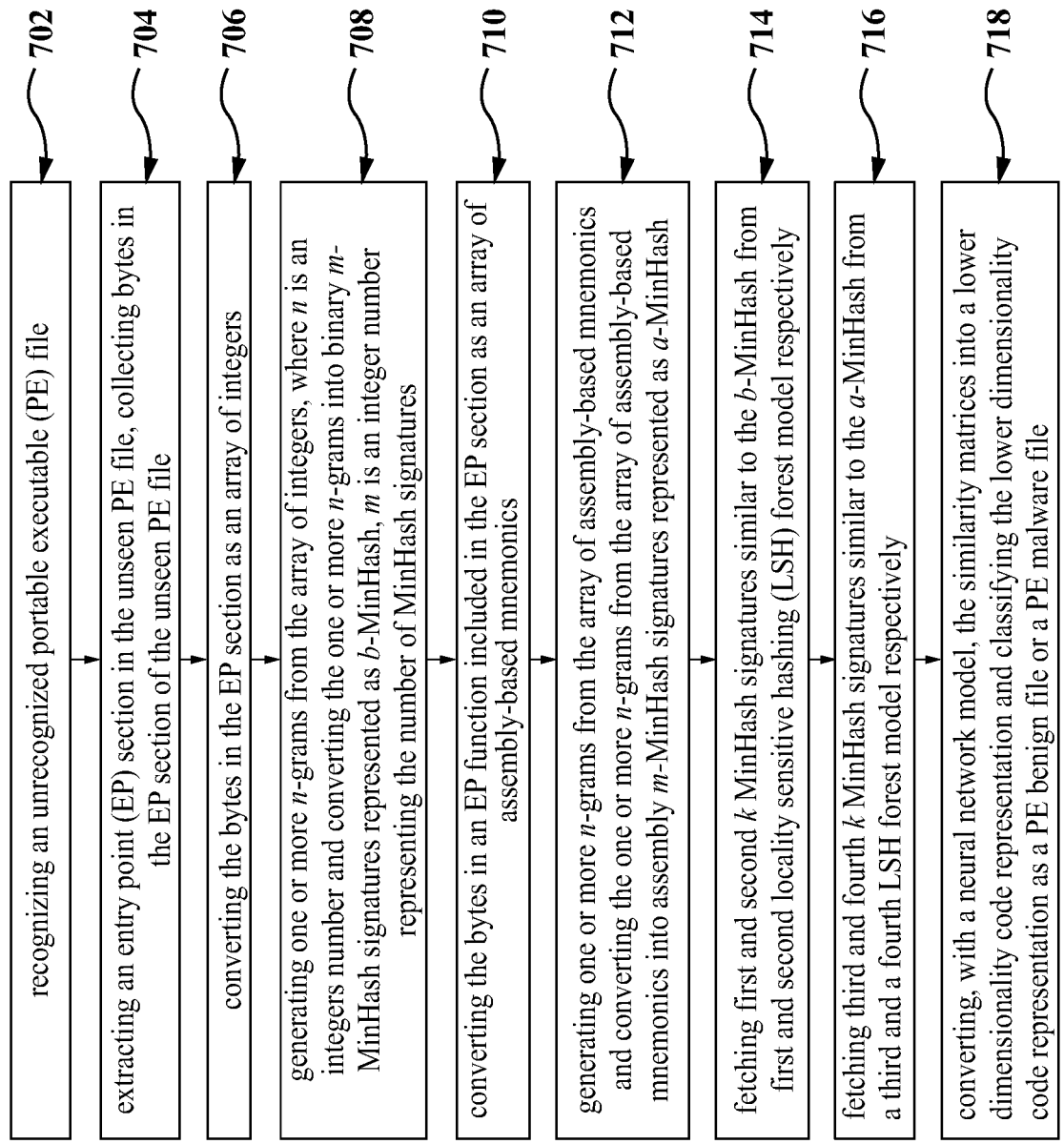

SYSTEM, METHOD AND APPARATUS FOR MALICIOUS SOFTWARE DETECTION

CROSS-REFERENCE TO RELATED APPLICATIONS

This is the first application filed for the instantly disclosed technology.

TECHNICAL FIELD

The present disclosure generally relates to computer-related security and, in particular, to a system, and a method for malicious software detection.

BACKGROUND

With increase in usage of the Internet, cyber security has been a major concern for business of all sizes. Fifth generation (5G) wireless communication technologies and beyond systems and computer networks are not an exception. The growth in sophisticated and obfuscated malwares continues to increase and currently exceeds 1 billion forms of unique malwares. Such malwares can severely affect and/or degrade performance of various computer systems and computer networks.

In particular, the term "malware" refers to any software-based entity designed to infiltrate, compromise, or damage a computer system without the user's informed consent. Malware can include viruses, worms, Trojans, botnets, spyware, and adware and any other malicious and unwanted software. For example, worms replicate themselves across a computer network to quickly infect a large number of computer systems. Trojans disguise themselves as legitimate software residing on the computer systems and computer networks and attempt to steal the user's identification, password, and other personal information. Botnets are groups of infected computer systems that are remotely controlled in which individual bots (computer systems) can be instructed to send SPAM email or participate in denial of service attacks. Spyware is designed to capture keystrokes, credit card numbers, and other personal information. Adware infects a device and downloads and displays unwanted advertisements.

Many of these malwares will harm computer systems without a practical (fast) and reliable (low false positive) solutions for detection and prevention. Nowadays, malware developers, equipped with Machine Learning (ML) techniques and open-source data, are continuously developing advanced malware and trying to vanquish the current solutions, even the ones enabled by ML. The malware developers are extensively utilizing obfuscation, polymorphism, and metamorphism techniques to change the representation of the malwares while keeping the malicious functionality intact.

In view of these advanced malware techniques, certain static malware analysis techniques directed to detecting malware with the current state-of-the-art binary and assembly Portable Executable (PE) file representations are not as effective and becoming obsolete. In addition, many ML-based malware detection techniques are generating high false positive rate (FPR) or/and low true positive rate (TPR) for new edge malwares due to lack of good file representations.

With that being said, there is a need to develop malware detection system which is reliable and capable of providing fast file threat detection (for computer system) and fast stream-threat-detection (for computer networks).

SUMMARY

The embodiments of the present disclosure have been developed based on developers' appreciation of shortcomings associated with the prior art.

The present disclosure provides malware detection system which is reliable and capable of providing fast file threat detection (for computer system) and fast stream-threat-detection (for computer networks).

In accordance with the first broad aspect of the present disclosure, there is provided method for malicious software detection comprising: recognizing an unrecognized portable executable (PE) file; extracting an entry point (EP) section in the unrecognized PE file that contains address information where the programming instructions of a PE file starts and ends; collecting bytes in the EP section of the unrecognized PE file; converting the bytes in the EP section to an array of integers; generating one or more n-grams from the array of integers, where n is an integer number and converting the one or more n-grams into binary m-MinHash signatures represented as b-MinHash, m is an integer number representing the number of MinHash signatures; converting the bytes in an EP function included in the EP section to an array of assembly-based mnemonics; generating one or more n-grams from the array of assembly-based mnemonics and converting the one or more n-grams from the array of assembly-based mnemonics into assembly m-MinHash signatures represented as a-MinHash; fetching first k MinHash signatures similar to the b-MinHash from a first locality sensitive hashing (LSH) forest model; fetching second k MinHash signatures similar to the b-MinHash from a second LSH forest model; fetching third k MinHash signatures similar to the a-MinHash from a third LSH forest model; fetching fourth k MinHash signatures similar to the a-MinHash from a fourth LSH forest model; representing the first, second, third, and fourth k MinHash signatures as similarity matrices; converting, with a neural network model, the similarity matrices into a lower dimensionality code representation; classifying the lower dimensionality code representation as one of a PE benign file and a PE malware file; and generating a remedial action in response to classifying the lower dimensionality code representation as the PE malware file.

In accordance with other aspects of the present disclosure, the method, wherein converting the bytes in the EP section as the array of integers includes truncating or zero-padding the array of integers to a fixed length array.

In accordance with other aspects of the present disclosure, the method, wherein the first LSH forest model is generated for known PE benign files using binary m-MinHash signatures related to the known PE benign files.

In accordance with other aspects of the present disclosure, the method, wherein the second LSH forest model is generated for known PE malware files using binary m-MinHash signatures related to the known PE malware files.

In accordance with other aspects of the present disclosure, the method, wherein the third LSH forest model is generated for known PE benign files using assembly m-MinHash signatures related to the known PE benign files.

In accordance with other aspects of the present disclosure, the method, wherein the fourth LSH forest model is generated for known PE malware files using assembly m-MinHash signatures related to the known PE malware files.

In accordance with other aspects of the present disclosure, the method, wherein the neural network model is a convolutional neural network autoencoder.

In accordance with other aspects of the present disclosure, the method wherein the neural network model is trained using the known PE benign files and known PE malware files.

In accordance with other aspects of the present disclosure, the method, wherein the remedial action is removing the PE malware file from the electronic device.

In accordance with other aspects of the present disclosure, the method, wherein the remedial action is quarantining the PE malware file.

In accordance with the second broad aspect of the present disclosure, there is provided system for malicious software detection comprising: at least one processor; and at least one memory including program code which when executed by the at least one memory provides operations comprising: recognizing an unrecognized portable executable (PE); extracting an entry point (EP) section in the unrecognized PE file that contains address information where the programming instructions of a PE file starts and ends; collecting bytes in the EP section of the unrecognized PE file; converting the bytes in the EP section to an array of integers; generating one or more n-grams from the array of integers, where n is an integer number and converting the one or more n-grams into binary m-MinHash signatures represented as b-MinHash, m is an integer number representing the number of MinHash signatures; converting the bytes in an EP function included in the EP section to an array of assembly-based mnemonics; generating one or more n-grams from the array of assembly-based mnemonics and converting the one or more n-grams from the array of assembly-based mnemonics into assembly m-MinHash signatures represented as a-MinHash; fetching first k MinHash signatures similar to the b-MinHash from a first locality sensitive hashing (LSH) forest model; fetching second k MinHash signatures similar to the b-MinHash from a second LSH forest model; fetching third k MinHash signatures similar to the a-MinHash from a third LSH forest model; fetching fourth k MinHash signatures similar to the a-MinHash from a fourth LSH forest model; representing the first, second, third, and fourth k MinHash signatures as similarity matrices; converting, with a neural network model, the similarity matrices into a lower dimensionality code representation; classifying the lower dimensionality code representation as one of a PE benign file and a PE malware file; and generating a remedial action in response to classifying the lower dimensionality code representation as the PE malware file.

In accordance with other aspects of the present disclosure, the system, wherein converting the bytes in the EP section as the array of integers includes truncating or zero-padding the array of integers to a fixed length array.

In accordance with other aspects of the present disclosure, the system, wherein the first LSH forest model is generated for known PE benign files using binary m-MinHash signatures related to the known PE benign files.

In accordance with other aspects of the present disclosure, the system, wherein the second LSH forest model is generated for known PE malware files using binary m-MinHash signatures related to the known PE malware files.

In accordance with other aspects of the present disclosure, the system, wherein the third LSH forest model is generated for known PE benign files using assembly m-MinHash signatures related to the known PE benign files.

In accordance with other aspects of the present disclosure, the system, wherein the fourth LSH forest model is generated for known PE malware files using assembly m-MinHash signatures related to the known PE malware files.

In accordance with other aspects of the present disclosure, the system, wherein the neural network model is a convolutional neural network autoencoder.

In accordance with other aspects of the present disclosure, the system, wherein the neural network model is trained using the known PE benign files and known PE malware files.

In accordance with other aspects of the present disclosure, the system, wherein the remedial action is removing the PE malware file from the electronic device.

In accordance with other aspects of the present disclosure, the system, wherein the remedial action is quarantining the PE malware file.

BRIEF DESCRIPTION OF THE FIGURES

Further features and advantages of the present disclosure will become apparent from the following detailed description, taken in combination with the appended drawings, in which:

FIG. 5 illustrates an example of an array of integers having 1024 integers, in accordance with various embodiments of present disclosure;

FIG. 6 illustrates an array of assembly-based mnemonics disassembled from raw bytes in the entry point (EP) function, in accordance with various embodiments of present disclosure;

FIG. 7 illustrates m MinHash from 1-gram, bi-gram, and tri-gram (shingles) of the array of integers, in accordance with various embodiments of present disclosure;

FIG. 8 illustrates m MinHash from 1-gram, bi-gram, and tri-gram (shingles) of the array of assembly-based mnemonics, in accordance with various embodiments of present disclosure;

FIG. 10 illustrates an algorithm to fetch the MinHash signatures from the LSH forest model dataset, in accordance with various embodiments of present disclosure;

FIG. 15 illustrates a 2D CNN-AE architecture for k=10, m=128 similarity matrices, in accordance with various embodiments of present disclosure;

FIG. 16 illustrates a Deep Neural Network (DNN) model-based architecture, in accordance with various embodiments of present disclosure; and FIG. 17 depicts a flowchart representing a process corresponding to a malicious software detection method implemented on the malicious software detection system, in accordance with various embodiments of the present disclosure.

Figure 1:
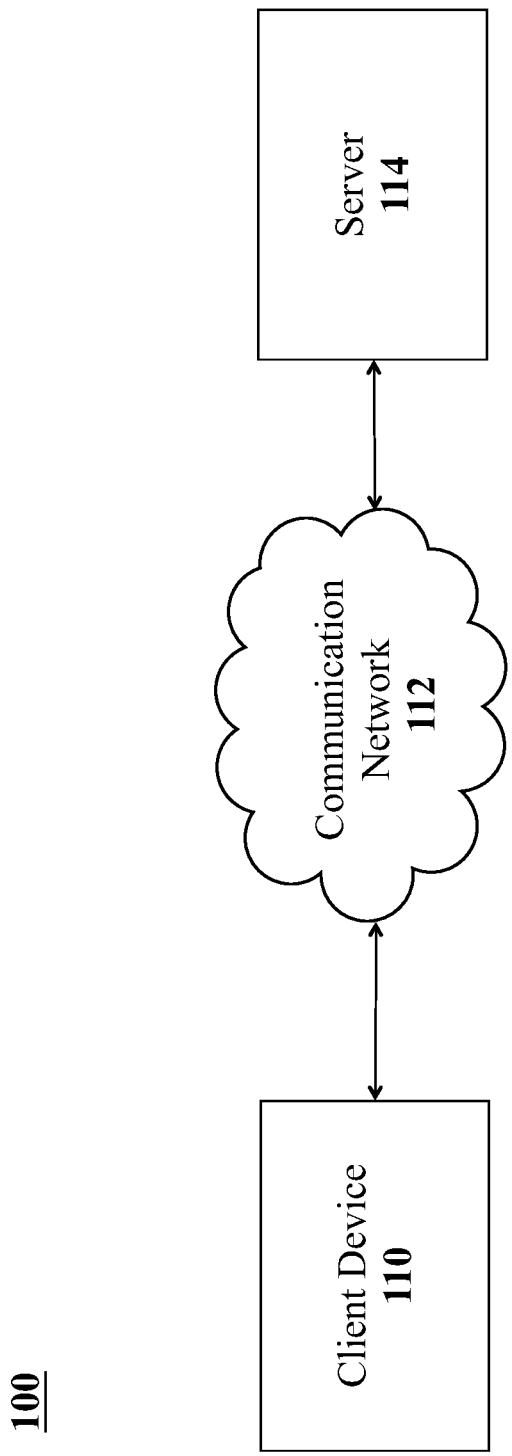
FIG. 1 depicts an environment for malicious software detection system configured to detect malicious software, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for malicious software detection.

Unless otherwise defined or indicated by context, all technical and scientific terms used herein have the same meaning as commonly understood by one of ordinary skill in the art to which the described embodiments appertain to.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for malicious software detection.

In particular, FIG. 1 depicts an environment 100 for malicious software detection system configured to detect malicious software, in accordance with various embodiments of the present disclosure. In various embodiments, the term "malware" and "malicious" may be used in an interchangeable manner. The environment 100 may include multiple client devices 110 (for the purpose of simplicity only one client device 110 has been illustrated) located and different geographic locations that are configured to communicate with each other via a communication network 112 and a server 114. In certain embodiments, multiple client devices 110 may be associated with individual users (such as, users of personal computers, laptops, desktops, or the like) or a part of network (such as, client devices in an organization, etc.).

Figure 2A:
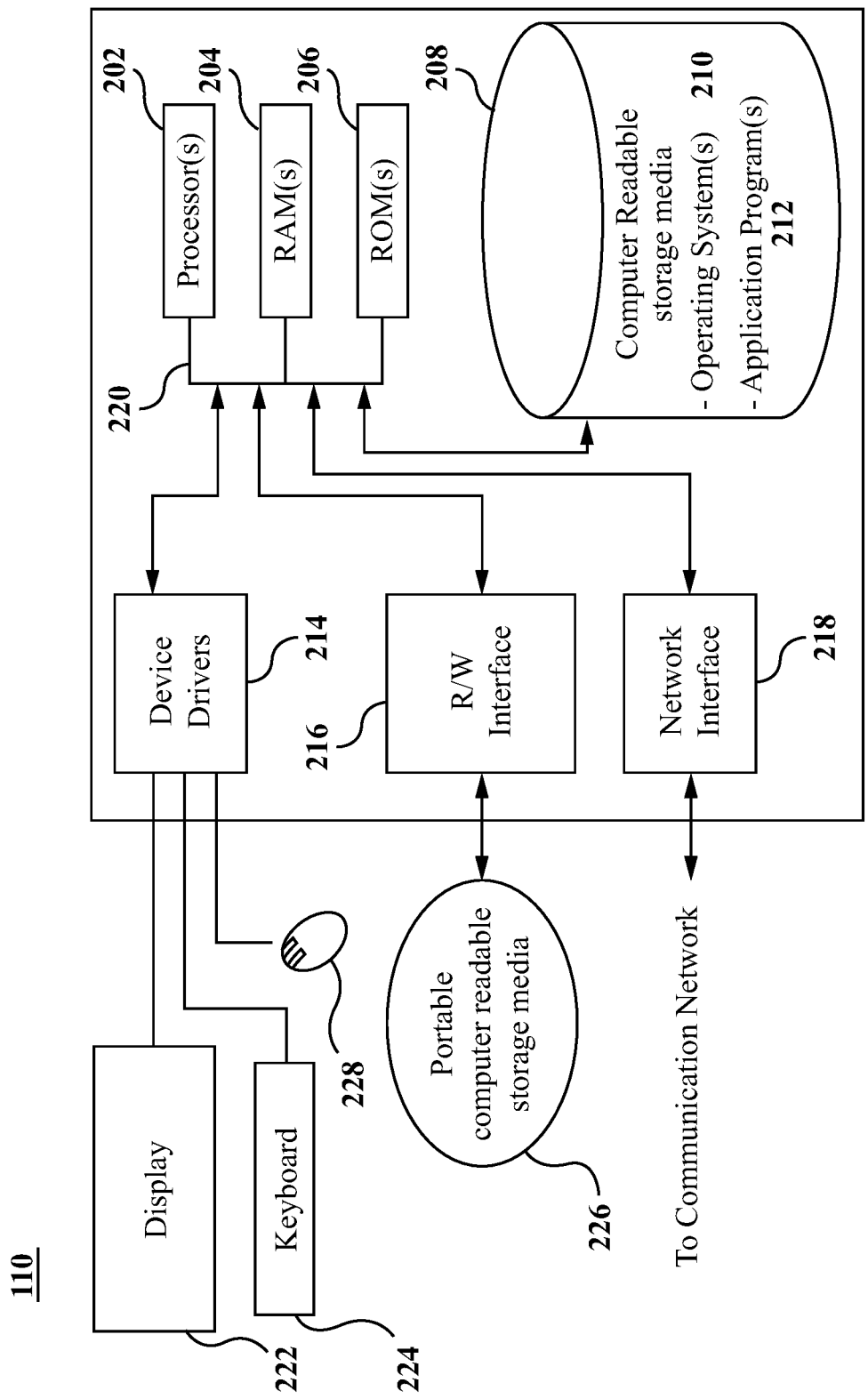
FIG. 2A depicts a high-level functional block diagram of a client device of the environment of FIG. 1, in accordance with various embodiments of the present disclosure.

FIG. 2A depicts a high-level block diagram of components of client device 110, in accordance with various embodiments of the present disclosure. It should be appreciated that FIG. 2A provides only an illustration of one implementation of client device 110 and does not imply any limitations with regard to the environments in which different embodiments may be implemented. Many modifications to the depicted environment can be done to implement client device 110 without departing from the principles presented herein. The client device 110 may be a server, a desktop computer, a laptop computer, or any device that may be configured to implement the present technology, as should be understood by a person skilled in the art.

As shown, the client device 110 employs one or more processors 202, one or more computer-readable random access memories (RAMs) 204, one or more computer-readable read only memories (ROMs) 206, one or more computer-readable storage media 208, device drivers 214, a read/write (R/W) driver interface 216, a network interface 218, all interconnected over a communication fabric 220. The communication fabric 220 may be implemented with any architecture designed for passing data and/or control information between processors (such as microprocessors, communications and network processors, etc.), system memory, peripheral devices, and any other hardware components within a system.

One or more operating systems 210 and one or more application programs 212 are stored on one or more of computer-readable storage media 208 for execution by one or more of the processors 202 via one or more of respective RAMs 204 (which typically include a cache memory). In the illustrated embodiment, each of the computer-readable storage media 208 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 216 reads from and writes to one or more portable computer-readable storage media 226. The application programs 212 may be related to the malicious software detection and stored on one or more of portable computer-readable storage media 226, read via the respective R/W driver interface 216 and loaded into the respective computer-readable storage media 208.

Further, the network interface 218 may be based on a TCP/IP adapter card or wireless communication adapter (such as a 4G wireless communication adapter using OFDMA technology). The application programs 212 on client device 110 may be downloaded to client device 110 from an external computer or external storage device via a communication network (for example, the Internet, a local area network or other wide area network or wireless network) and network interface 218. From network interface 218, application programs 212 may be loaded onto the computer-readable storage media 208. The client device 110 may connect to routers, firewalls, switches, gateway computers and/or edge servers of the communication network using copper wires, optical fibers, wireless transmission, and the like.

The client device 110 may also include a display screen 222, a keyboard or keypad 224, and a computer mouse or touchpad 228. The device drivers 214 may interface with display screen 222 for imaging, with the keyboard or the keypad 224, with computer mouse or touchpad 228, and/or with display screen 222 (which may be a touch sensitive display) for alphanumeric character entry and user selections. The device drivers 214, R/W driver interface 216 and network interface 218 may comprise hardware and software (stored on the computer-readable storage media 208 and/or the ROM 206).

Figure 2B:
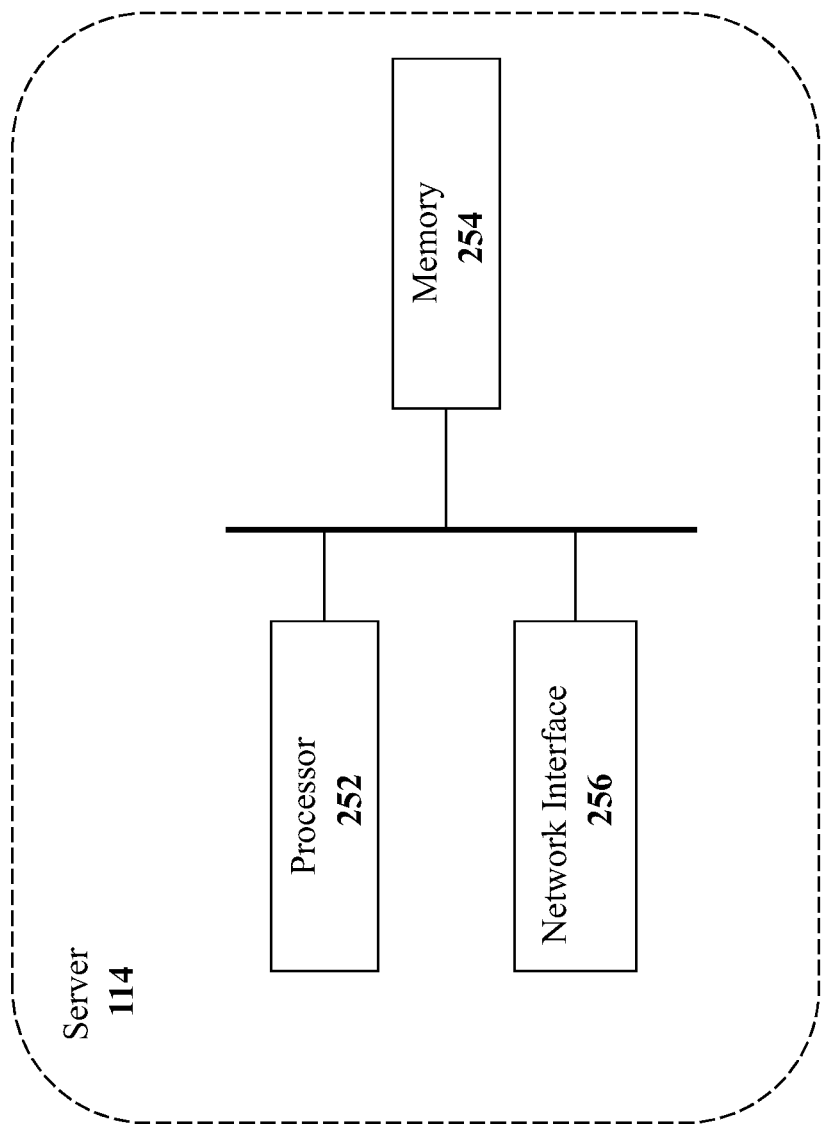
FIG. 2B depicts a high-level functional block diagram of the server of the environment of FIG. 1, in accordance with various embodiments of the present disclosure.

FIG. 2B depicts a high-level functional block diagram of server 114 of environment 100 of FIG. 1, in accordance with various embodiments of the present disclosure. In this embodiment, server 114 is a physical machine (e.g. a physical server) or virtual machine (e.g. a virtual server) that executes application programs to enable client devices 110 to communicate with server 114. The server 114 may include a processor 252, a memory 254, and a network interface 256. It is to be noted that the server 114 may include other components but have not been illustrated for the purpose of simplicity.

The processor 252 of server 114 may include one or more of a CPU, an accelerator, a microprocessor, a GPU, an ASIC, a FPGA, a dedicated logic circuitry, a dedicated artificial intelligence processor unit, or combinations thereof.

The memory 254 may include volatile memory (e.g. RAM) and non-volatile or non-transitory memory (e.g., a flash memory, magnetic storage, and/or a ROM). The non-transitory memory(ies) stores a platform that controls the overall operation of server 114. The platform, when executed by processor 252, implements application programs related to the malicious software detection.

The network interface 256 may include one or more radios configured for wireless communications with communication network 112, or one or more network adaptors configured for wired communications with communication network 112. In general, network interface 256 may be configured to correspond with the network architecture of that is used to implement a link for communications between server 114 and communication network 112. In certain embodiments, network interface 256 may be implemented in a similar manner as network interface 218 has been implemented.

It is to be noted that server 114 is shown as a standalone computer. However, the implementation of various other embodiments of the present disclosure may include any client-server model where client devices may run a client version of the application programs related to the malicious software detection. Other examples of server 114 may include a distributed computing system that runs the server version of the application programs related to the malicious software detection, a virtual machine (or virtual machines) instantiated by the infrastructure of a public or private cloud, or a cloud service provider that provides the application programs related to the malicious software detection as a service (SaaS). Such implementations or any other similar implementation should not limit the scope of the present disclosure.

In other non-limiting embodiments, client device 110 may use a web browser, such as, for example, Chrome™, Safari™, Mozilla™, or the like to facilitate application programs related to the malicious software detection. It is to be noted that how client devices 110 are configured to facilitate application programs related to the malicious software detection should not limit the scope of the present disclosure by any means.

As previously discussed, various ML-based malware detection techniques are designed to generate high false positive rate (FPR) or/and low true positive rate (TPR) for new edge malwares due to lack of good file representations. To counter the drawbacks of existing ML-based malware detection techniques, the present disclosure discloses a solution that includes assembly-based or/and binary-based hashed features of both PE benign and malware files. The present disclosure relies on finding an evolving data-driven representation of any portable executable (PE) file which represent its similarity to both PE malware and benign files in one single representation known as similarity matrices (SM). Such an SM representation may include but is not limited to depicting, or signifying, or combining, or creating, or arranging into a different or more useful form, and benefits from the evolution of big data collection of PE benign and malware files. In addition, in certain embodiments, a Convolutional Neural Network Auto Encoder (CNN-AE) architecture may be applied on the SM to remove redundancy and improve predictability of maliciousness in PE files.

Figure 3:
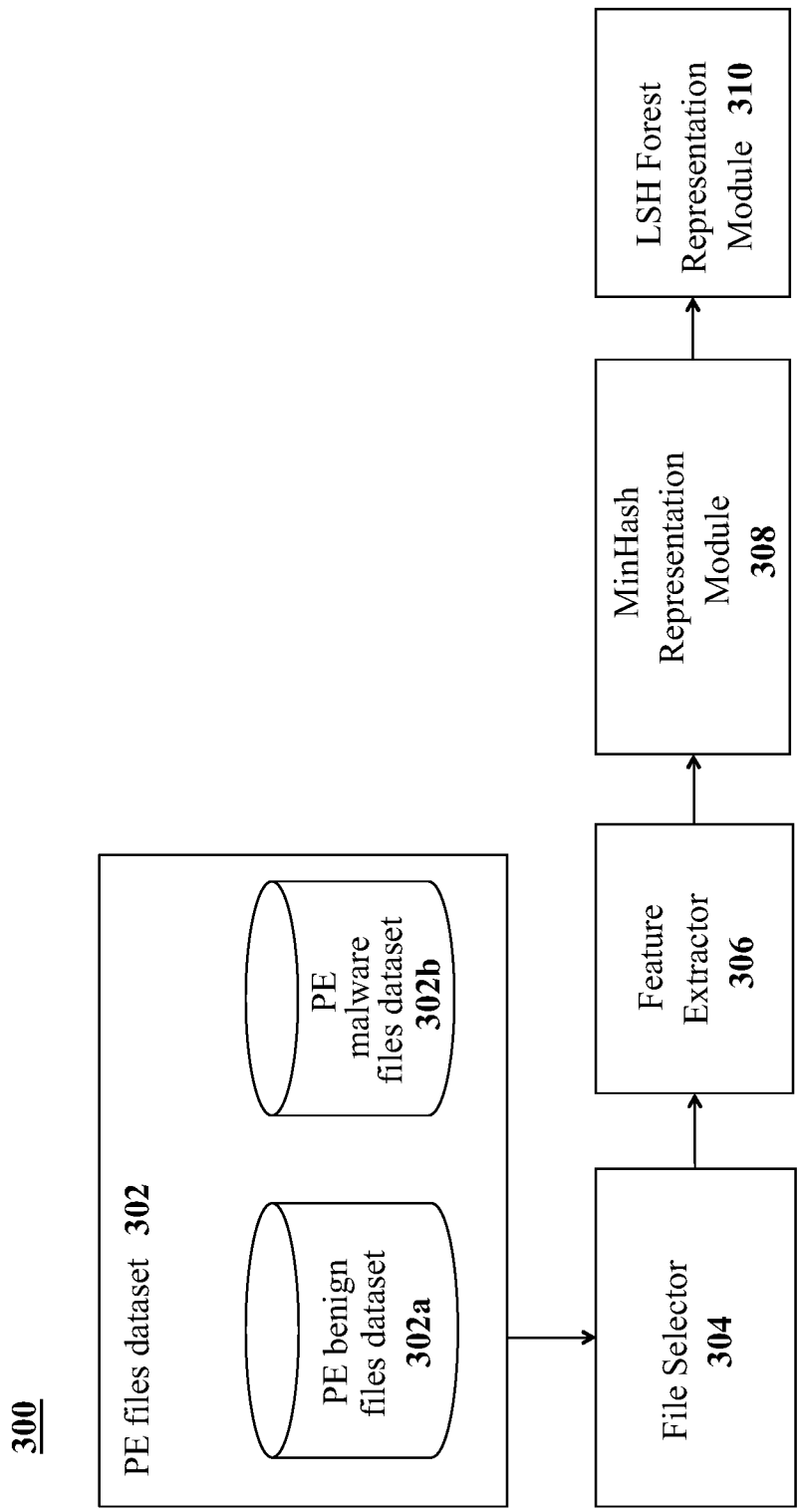
FIG. 3 depicts a high-level functional block diagram of a system configured to create evolving and data-driven locality sensitive hashing (LSH) forest models for the available PE benign files and PE malware files, in accordance with various embodiments of the present disclosure.

FIG. 3 depicts a high-level functional block diagram of a system 300 configured to create evolving and data-driven locality sensitive hashing (LSH) forest models for the available PE benign files and PE malware files, in accordance with various embodiments of the present disclosure. As shown, system 300 includes a PE files dataset 302, a file selector 304, a feature extractor 306, a MinHash representation module 308, and an LSH forest representation module 310. It is to be noted that system 300 may include other components and modules but have not been illustrated for the purpose of simplicity.

In certain embodiments, system 300 and the associated modules and components may be implemented on client device 110. In other embodiments, system 300 and the associated modules and components may be implemented on server 114. In yet another embodiment, some of the modules and components of system 300 may be implemented on client device 110 while other modules and components may be implemented on server 114. It is contemplated that where system 300 has been implemented should not limit the scope present disclosure.

With this said, PE files dataset 302 may include a PE benign files dataset 302a and a PE malware files dataset 302b. The PE benign files dataset 302a may include PE benign files that are already known in the art. Similarly, the PE malware files dataset 302a may include PE malware files that are also already known in the art. In certain embodiments, the PE benign files may be represented in a binary format (e.g., binary files or portions or blocks of binary code or sequences of bits) and the PE malware files may be represented in assembly language format (e.g. mnemonics such as 'mov', 'push', 'call' or the like).

Figure 4:
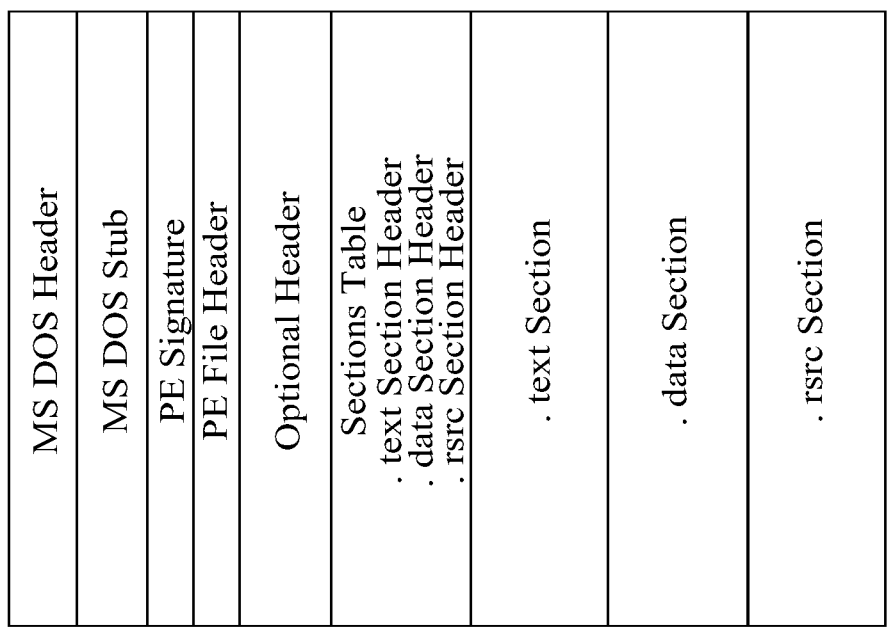
FIG. 4 illustrates a PE file structure, in accordance with various embodiments of present disclosure.

FIG. 4 illustrates a PE file structure 400, in accordance with various embodiments of present disclosure. The PE file structure 400 is a file format for executables, object code, DLLs, FON Font files, or the like used in 32-bit and 64-bit versions of Windows operating systems. The term "Portable Executable" refers to the fact that PE file structure 400 is not architecture specific. In certain embodiments, PE file structure 400 may be organized as a linear stream of data. The PE file structure 400 may begin with an MS-DOS header followed by a MS DOS stub, a valid application that runs under MS-DOS. After the MS DOS stub there is a PE file signature. In certain embodiments, the PE signature may be of 4-byte signature that identifies the file a PE format image file. The PE signature may be "PE\0\0" (the letters "P" and "E" followed by two null bytes). Immediately following PE signature are the PE file header and optional header. Beyond that, all the section headers follow.

Returning to FIG. 3, file selector 304 may be configured to select a PE benign file from PE benign files dataset 302a. The file selector 304 may provide the selected PE benign file to feature extractor 306. The feature extractor 306 may be configured to extract an entry point (EP) section in the selected PE benign file. The EP section may contain address information where the programming instructions of a PE file starts and ends, and the EP section may represent an area on the PE file that includes raw bytes related to the programming instructions. In order to extract the EP section, feature extractor 306 may verify if the address of the EP is within the boundaries of the section in the optional header such as ".text" section (as shown in FIG. 4).

Figure 5:
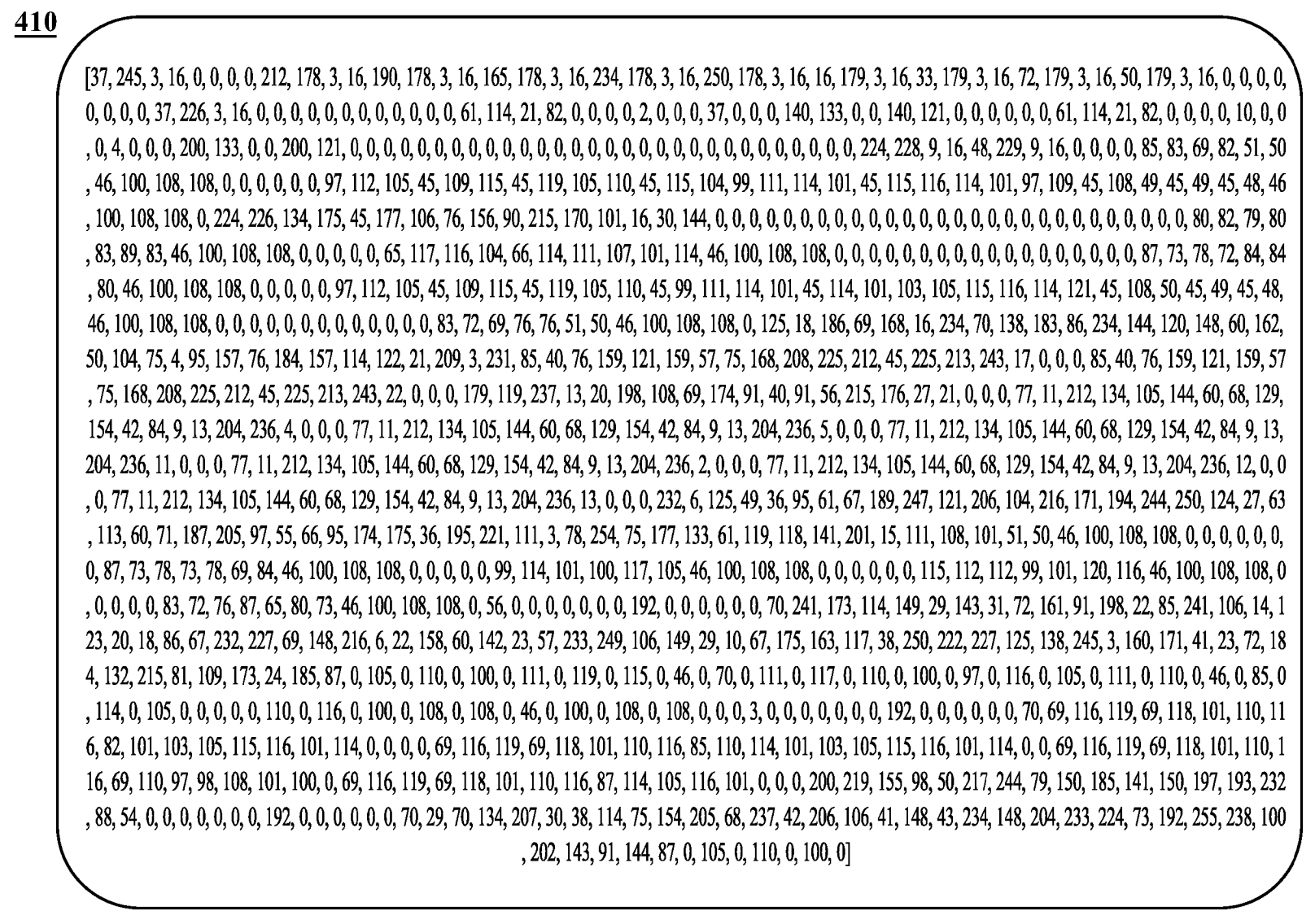

Once feature extractor 306 identifies the EP section in the selected PE benign file, feature extractor 306 may be configured to collect all the raw bytes in the EP section. In certain embodiments, feature extractor 306 may convert the raw bytes in the EP section to integer numbers from 0 to 256 (0000000-1111111). In certain embodiments, feature extractor 306 may either truncate or perform zero padding to create an array of integers having a predefined size. FIG. 5 illustrates an example of an array of integers 410 having 1024 integers, in accordance with various embodiments of present disclosure.

Returning to FIG. 3, feature extractor 306 may provide array of integers 410 to MinHash representation module 308. The MinHash representation module 308 may be configured to generate (e.g., produce, create, report, or otherwise bring about or settle upon or the like) 1-gram, bi-gram, and tri-gram (shingles) of array of integers 410 where an n-gram is a contiguous sequence of n items from a given sample of text (integers in this case).

In certain embodiments, feature extractor 306 may be configured to convert the raw bytes in an EP function included in the EP section to assembly language-based mnemonics. The EP Function is often a main function where the first instructions of a program are executed. Without limiting the scope of present disclosure, in certain embodiments, the feature extractor 306 may rely on a "radare2" framework to accurately determine the start and end on the EP function. In addition, in certain embodiments, feature extractor 306 may also rely on capstone framework for disassembly process. The feature extractor 306 may disassemble the raw bytes using a capstone framework and provide an array of assembly language-based mnemonics 420 as illustrated in FIG. 6.

Returning to FIG. 3, feature extractor 306 may provide the array of assembly language-based mnemonics to MinHash representation module 308. The MinHash representation module 308 may be configured to generate 1-gram, bi-gram, and tri-gram (shingles) of the array of assembly-based mnemonics 420.

Figure 7:
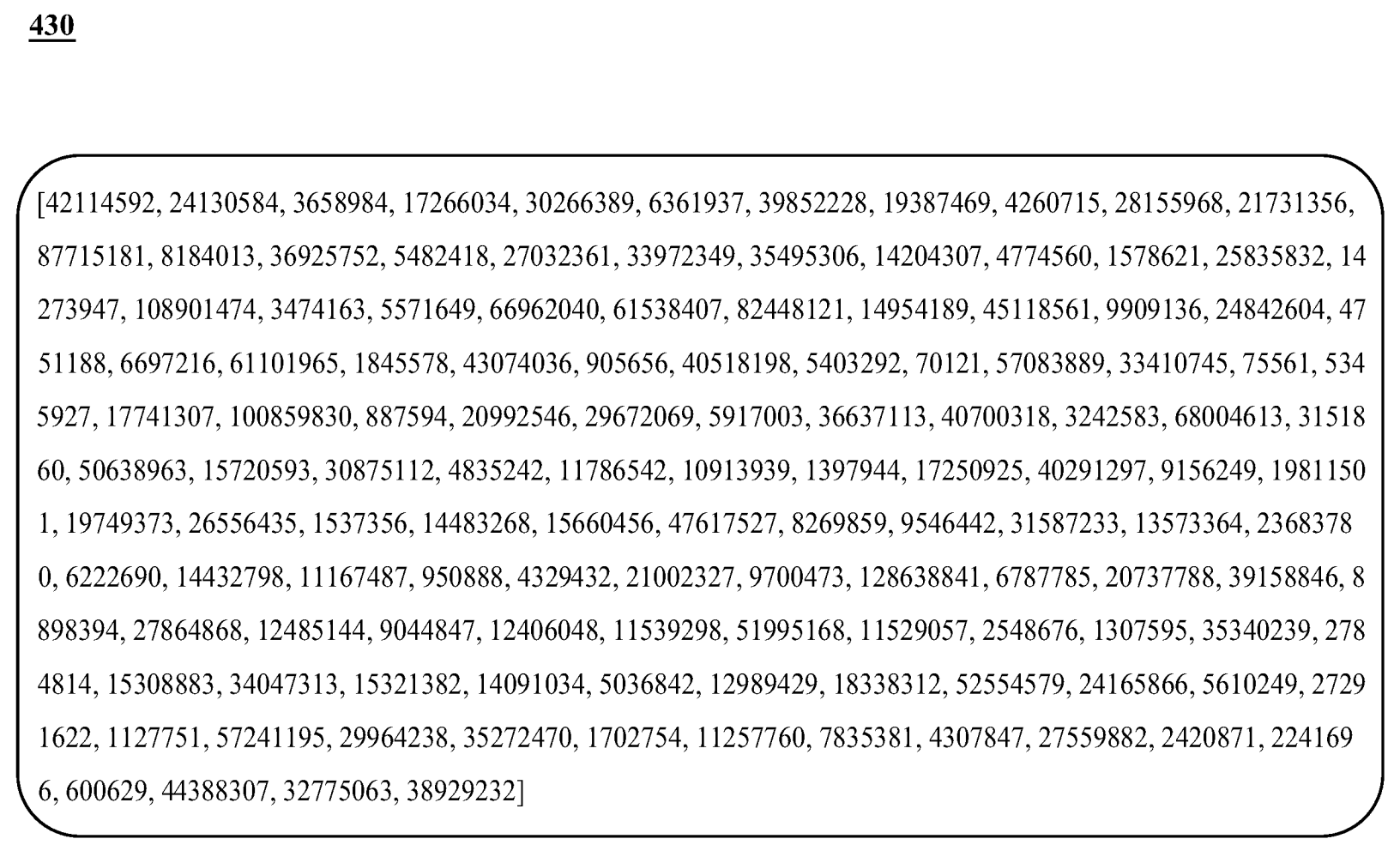
Figure 8:
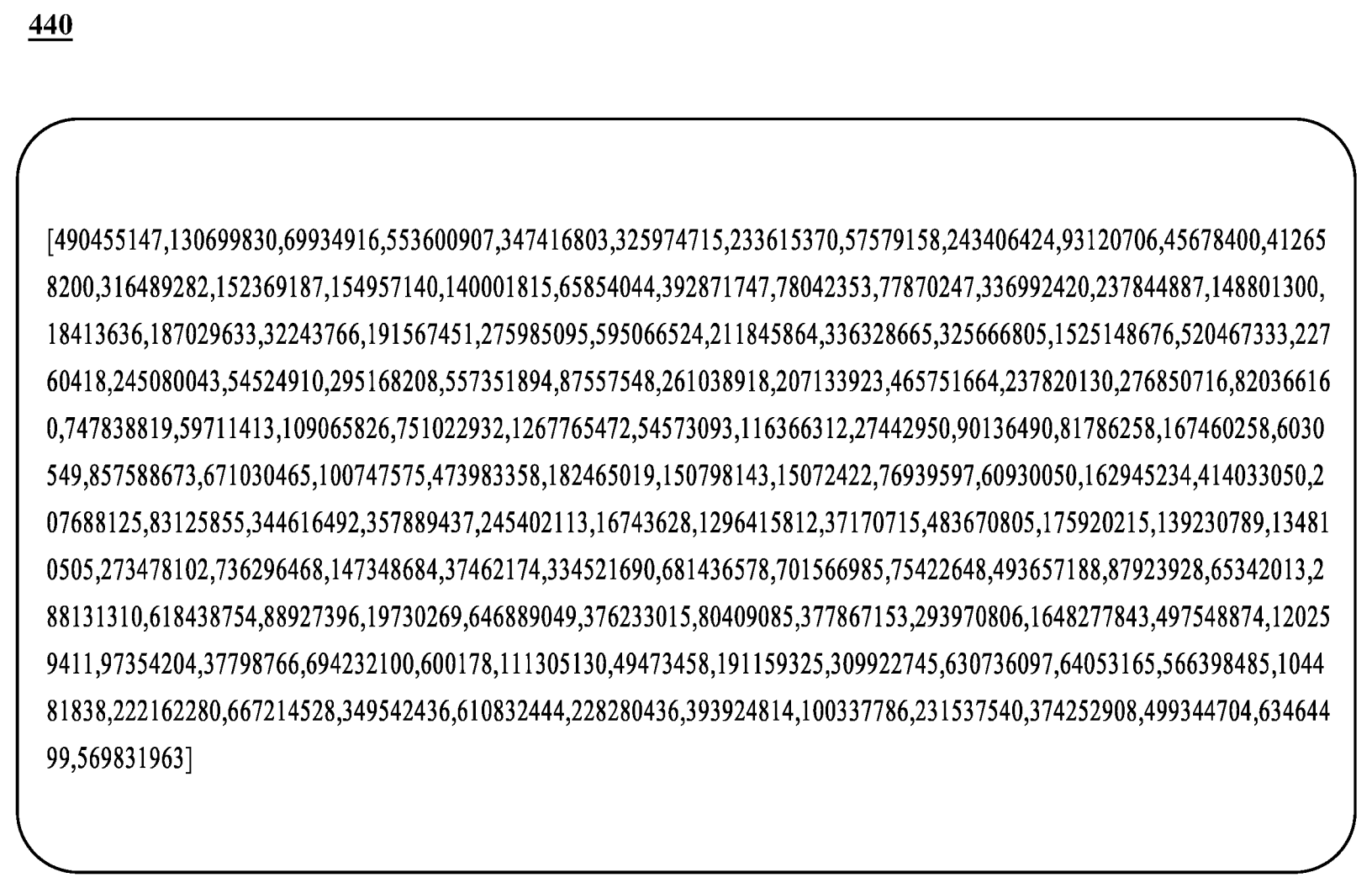

It is to be noted that since array of integers 410 and array of assembly language-based mnemonics 420 are represented as 1-gram, bi-gram, and tri-gram (shingles), a natural metric for similarity based on Jaccard distances (or, Jaccard Similarity), which computes the intersection of the 1-gram, bi-gram, and tri-gram (shingles) divided by their union. Jaccard distance, however, can be expensive to compute. To this end, in certain embodiments, MinHash representation module 308 may be configured to generate binary m-MinHash signatures 430 (as illustrated in FIG. 7) from 1-gram, bi-gram, and tri-gram (shingles) of array of integers 410 and assembly m-MinHash signatures 440 (as illustrated in FIG. 8) from 1-gram, bi-gram, and tri-gram (shingles) of array of assembly language-based mnemonics 420.

MinHash is an efficient locality-sensitive hashing (LSH) scheme for a fast approximation to the Jaccard Similarity. As such LSH refers to a family of functions (known as LSH families) to hash set of points (Shingles) into buckets so that data points near each other are located in the same buckets with high probability, while data points far from each other are likely to be in different buckets. Also, LSH Forest is a general LSH data structure that makes top-k query possible for MinHash LSH indexes.

Also, MinHash signatures are short integer vectors that represent the sets (e.g. array of integers 410, array of assembly language-based mnemonics 420, or the like), and reflect their similarity. The MinHash signature may be a sequence of numbers produced by multiple hash functions and can be used to estimate Jaccard similarity between two sets.

In certain embodiments, without losing the generality, the value of m may be equal to 128. The m-MinHash signatures may have a fixed length, independent of the size of array of integers 410 and the array of assembly language-based mnemonics 420. The m-MinHash signatures may ensure size-agnostic representation (representation size is independent of the PE file size).

It is to be noted that system 300 may be configured to perform similar operations on the PE malware files stored in PE malware files dataset 302b. In certain embodiments, file selector 304 may be configured to select a PE malware file stores in PE malware file dataset 302b. The file selector 304 may provide the selected PE malware file to feature extractor 306. The feature extractor 306 may be configured to extract an EP section in the selected PE malware file. The feature extractor 306 may also be configured to collect all the raw bytes in the EP section. In certain embodiments, feature extractor 306 may convert the raw bytes in the EP section to an integer number and generate an array of integers (as discussed above).

As noted above, related to the PE benign file, feature extractor 306 may provide an array of integers to MinHash representation module 308. The MinHash representation module 308 may be configured to generate 1-gram, bi-gram, and tri-gram (shingles) of the array of integers related to the PE malware file.

Also, as previously discussed, in certain embodiments, feature extractor 306 may be configured to convert the raw bytes in an EP function included in the EP section of the PE malware file to the array of assembly language-based mnemonics. The feature extractor 306 may provide the array of assembly language-based mnemonics related to PE malware file to MinHash representation module 308. The MinHash representation module 308 may be configured to generate 1-gram, bi-gram, and tri-gram (shingles) of the array of assembly language-based mnemonics.

In certain embodiments, MinHash representation module 308 may be configured to generate binary m-MinHash signatures from 1-gram, bi-gram, and tri-gram (shingles) of the array of integers related to the PE malware file and assembly m-MinHash signatures from 1-gram, bi-gram, and tri-gram (shingles) of the array of assembly language-based mnemonics related to the PE malware file. The MinHash representation module 308 may forward the binary and assembly m-MinHash signatures related to PE benign and malware files to LSH representation module 310.

The LSH representation module 310 may be configured to build four evolving and data-driven LSH forest models from the binary and assembly m-MinHash signatures related to PE benign and malware files. The first LSH forest model is for PE benign files using binary m-MinHash signatures related to PE benign files. The second LSH forest model is for PE benign files using assembly m-MinHash signatures related to PE benign files. The third LSH forest model is for PE malware files using binary m-MinHash signatures related to PE malware files. The fourth LSH forest model is for PE malware files using assembly m-MinHash signatures related to PE malware files.

It is contemplated that all the LSH forest models may be updated as required based on new PE benign and malware files added to PE benign files dataset 302a and PE malware files dataset 302b respectively.

In order to determine if any unrecognized PE file is a PE malware file or a PE benign file, the present disclosure discloses a technique where assembly m-MinHash signatures and binary m-MinHash signatures of the unrecognized PE file may be compared with the LSH forest models generated by LSH representation module 310 and extract top assembly m-MinHash signatures and binary m-MinHash signatures and represent them as a similarity matrix. The representation matrix may be used to train a two-dimensional (2D) CNN-AE network to detect PE malware files with high true positive rate (TPR) and low false positive rate (FPR).

Figure 9:
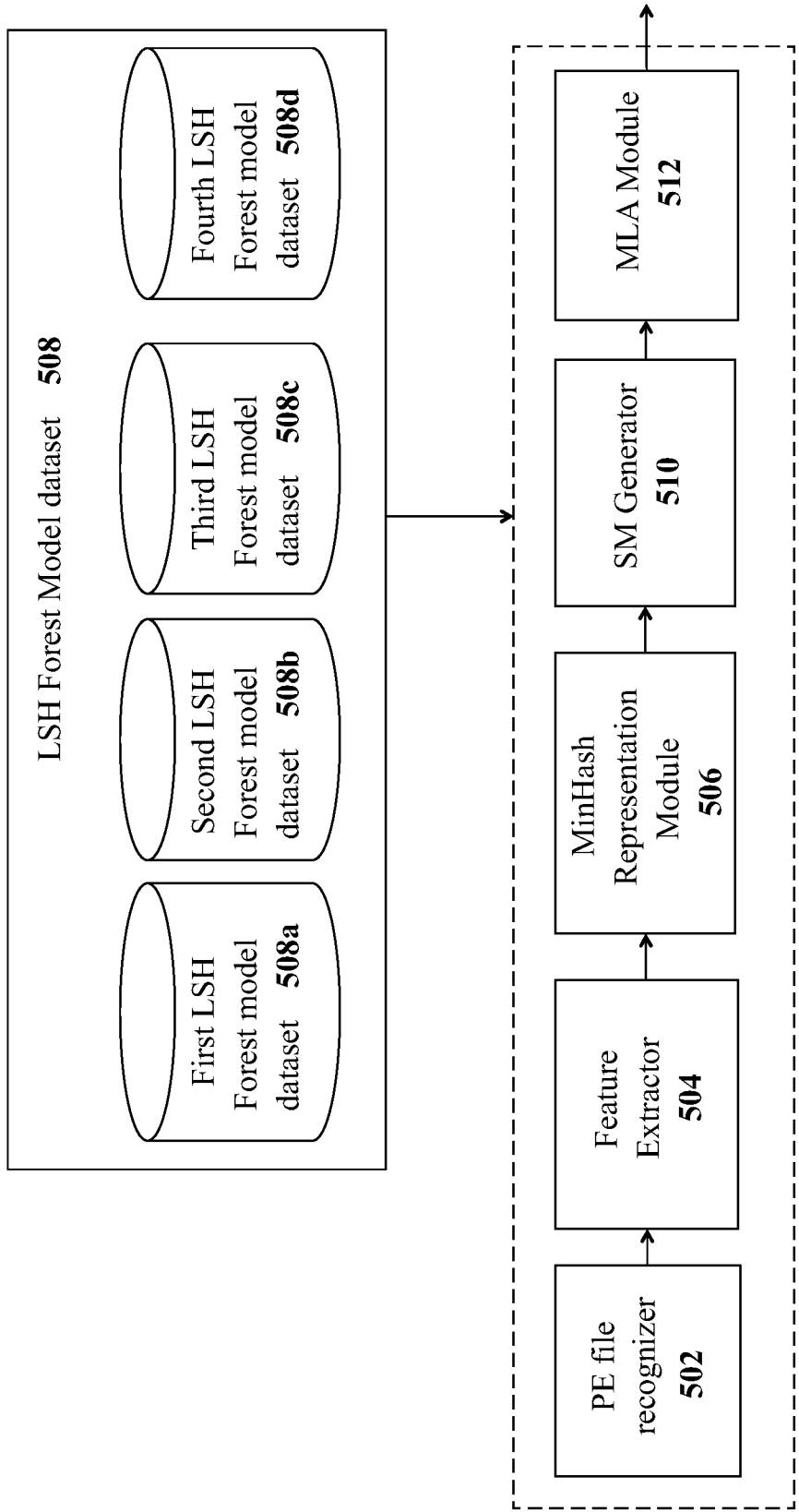
FIG. 9 illustrates a malicious software detection system, in accordance with various embodiments of present disclosure.

With this said, FIG. 9 illustrates a malicious software detection system 500, in accordance with various embodiments of present disclosure. As shown, malicious software detection system 500 includes an PE file recognizer 502, a feature extractor 504, a MinHash representation module 506, an LSH forest model dataset 508, a similarity matrix (SM) generator 510, and an MLA module 512. It is to be noted that malicious software detection system 500 may include other components but have not been illustrated for the purpose of simplicity.

In certain embodiments, malicious software detection system 500 and the associated modules and components may be implemented on client device 110. In other embodiments, malicious software detection system 500 and the associated modules and components may be implemented on server 114. In yet another embodiment, some of the modules and components of malicious software detection system 500 may be implemented on client device 110 while other modules and components may be implemented on server 114. It is contemplated that where malicious software detection system 500 has been implemented should not limit the scope present disclosure.

The PE file recognizer 502 may be configured to recognize an unrecognized PE file. By recognizing the unrecognized PE file, it may be referred to as identifying a PE file which is not being recognized by malicious software detection system 500 as at least one of a PE benign file and a PE malware file. It is to be noted that, from where and how PE file recognizer 502 recognizes the unrecognized PE file should not limit the scope of present disclosure. In certain embodiments, the unrecognized PE file may be stored in the one or more computer-readable storage media 208 of client device 110, may be stored in portable computer readable storage media 226, a part of a script being run in an Internet browser resulting in downloading of a PE file or the like.

The term "unrecognized PE file" may refer to any portable executable file that has not been a part of the PE benign files dataset 302a or the PE malware files dataset 302b. In other words, the unrecognized PE file may be associated with a new benign software but PE benign files dataset 302a has not been updated to include the new PE file related to the new benign software. Also, the unrecognized PE file may be associated with a new malicious software but PE malware files dataset 302b has not been updated to include the new PE file related to the new malicious software. However, in some examples the unrecognized PE file may be a part benign file dataset 302a or malware file 302b but malicious software detection system 500 may be unaware of the type of file as benign or malicious file unless malicious software detection system 500 process the unrecognized PE file.

The PE file recognizer 502 may provide the recognized unrecognized PE file to feature extractor 504. The feature extractor 504 may be configured to extract features from the unrecognized PE file in a similar manner as feature extractor 306 extracts features from the PE benign files and the PE malware files.

In particular, feature extractor 504 may be configured to extract an EP section in the detected unrecognized PE file. The feature extractor 504 may be configured to collect all the raw bytes in the EP section of the unrecognized PE file. In certain embodiments, feature extractor 504 may convert the raw bytes in the EP section to integer numbers representing an array of integers (as discussed above with regards to feature extractor 306). In certain embodiments, feature extractor 504 may either truncate or perform zero padding to the integer numbers and create an array of integers having a predefined size for example 1024.

Similar to feature extractor 306, feature extractor 504 may provide the array of integers to MinHash representation module 506. The MinHash representation module 506 may be configured to generate one or more n-grams such as 1-gram, bi-gram, and tri-gram (shingles) from the array of integers related to the unrecognized PE file.

Also, feature extractor 504 may be configured to convert the raw bytes in an EP function included in the EP section of the unrecognized PE file to the array of assembly language-based mnemonics. The feature extractor 504 may provide the array of assembly language-based mnemonics related to the unrecognized PE file to MinHash representation module 506. The MinHash representation module 506 may be configured to generate one or more n-grams such as 1-gram, bi-gram, and tri-gram (shingles) from the array of assembly language-based mnemonics.

In certain embodiments, MinHash representation module 506 may be configured to convert 1-gram, bi-gram, and tri-gram (shingles) of the array of integers related to the unrecognized PE file into binary m-MinHash signatures and 1-gram, bi-gram, and tri-gram (shingles) of the array of assembly language-based mnemonics related to the unrecognized PE file into assembly m-MinHash signatures. The MinHash representation module 506 may forward the binary and assembly m-MinHash signatures related to unrecognized PE file to SM generator 510, where m is an integer number representing the number of MinHash signatures.

For the purpose of simplicity hereinafter the binary m-MinHash signatures related to the unrecognized PE file have been represented as b-MinHash and assembly m-MinHash signatures related to the unrecognized PE file have been represented as a-MinHash.

In certain embodiments, the four evolving and data-driven LSH forest models as generated by LSH representation module 310 may be stored in LSH forest model dataset 508. The LSH forest model dataset 508 may include a first LSH forest model dataset 508a, a second LSH forest model dataset 508b, a third LSH forest model dataset 508c, and a fourth LSH forest model dataset 508d.

The first LSH forest model dataset 508a may include the LSH forest model generated for PE benign files using binary m-MinHash signatures related to PE benign files. The second LSH forest model dataset 508b may include the LSH forest model generated for PE benign files using assembly m-MinHash signatures related to PE benign files. The third LSH forest model dataset 508c may include the LSH forest model generated for PE malware files using binary m-MinHash signatures related to PE malware files. The fourth LSH forest model dataset 508d may include the LSH forest model generated for PE malware files using assembly m-MinHash signatures related to PE malware files.

Using, the b-MinHash, SM generator 510 may be configured to fetch k binary MinHash signatures similar to the b-MinHash from the first LSH forest model dataset 508a and represent them as k b-LSH-ben-(k). Also, SM generator 510 may be configured to fetch k binary MinHash signatures similar to the b-MinHash from the third LSH forest model dataset 508*c* and represent them as k b-LSH-mal-(k).

Using, the a-MinHash, SM generator 510 may be configured to fetch k assembly MinHash signatures similar to the a-MinHash from second LSH forest model dataset 508*b* and represent them as k a-LSH-ben-(k). Also, SM generator 510 may be configured to fetch k assembly MinHash signatures similar to the a-MinHash from fourth LSH forest model dataset 508*d* and represent them as k a-LSH-mal-(k).

It is to be noted that how SM generator 510 is fetching the MinHash signatures should not limit the scope of present disclosure. By way example, SM generator 510 may rely on a pseudocode 520 as illustrated in FIG. 10 to fetching the MinHash signatures from LSH forest model dataset 508 as discussed above. The pseudocode 520 is based on already known algorithms in the art and has been illustrated as one possible technique implemented by the SM generator 510 without limiting any scope.

The illustrated algorithm 520 takes a MinHash data sketch of the query set and returns the top-k matching sets that have the approximately highest Jaccard similarities with the query set. It is contemplated that algorithm 520 may be generalized to take a-MinHash, b-MinHash, and MinHash signatures stored in LSH forest model dataset 508 and provide the top-k similar MinHash signatures.

Figure 11:
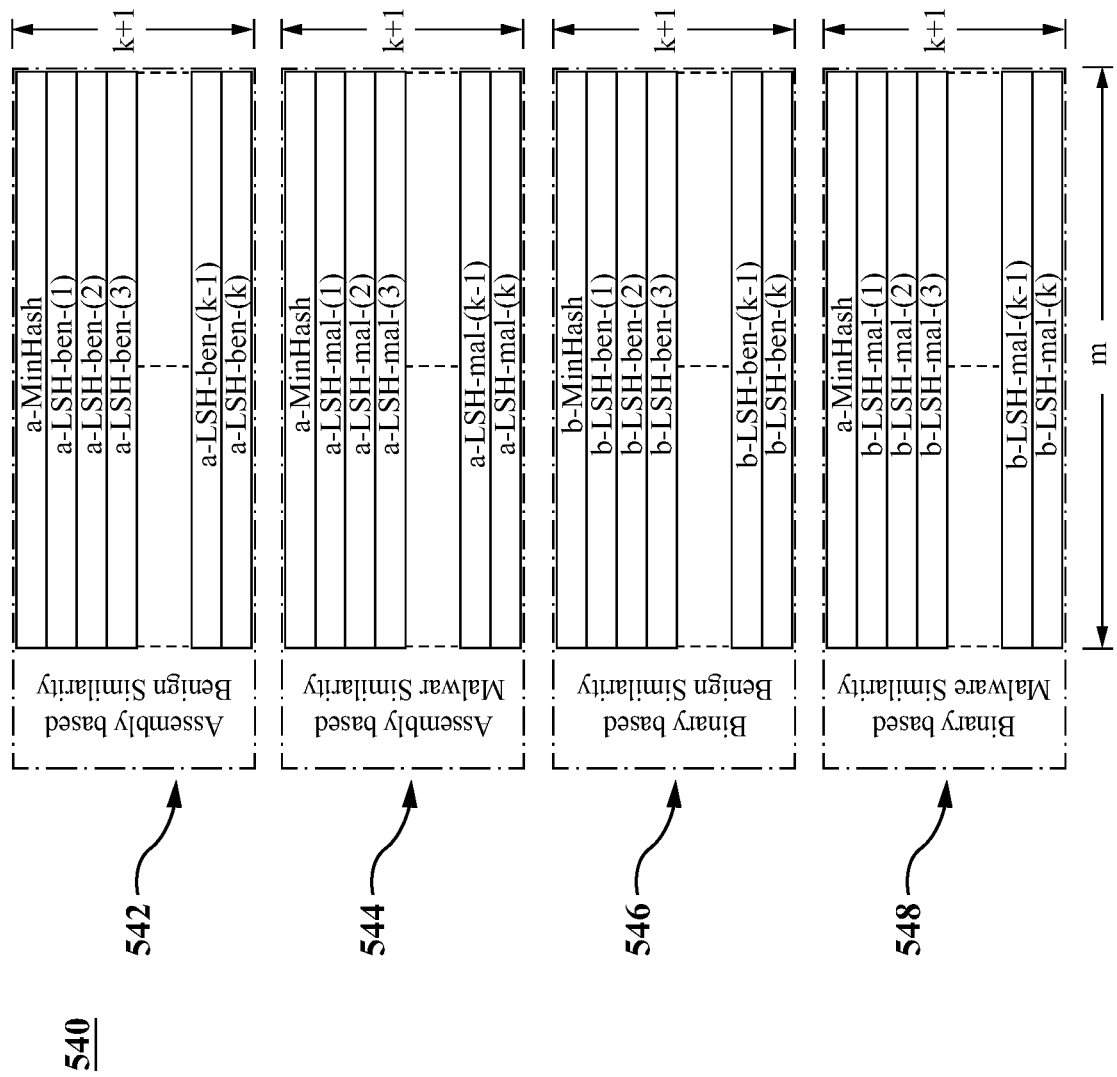
FIG. 11 illustrates an example of similarity matrices created by SM generator, in accordance with various embodiments of the present disclosure.

After fetching the MinHash signatures similar to the a-MinHash and b-MinHash, SM generator 510 may be configured to create similarity matrices. FIG. 11 illustrates an example of similarity matrices 540 created by SM generator 510, in accordance with various embodiments of the present disclosure. As shown, an assembly language-based benign similarity matrix 542 may include a-MinHash and k a-LSH-ben-(k). An assembly language-based benign similarity matrix 544 may include a-MinHash and k a-LSH-mal-(k). A binary-based benign similarity matrix 546 may include b-MinHash and k b-LSH-ben-(k). A binary based benign similarity matrix 542 may include b-MinHash and k b-LSH-mal-(k).

It is to be noted that the size of a-MinHash, b-MinHash, k a-LSH-ben-(k), k a-LSH-mal-(k), k b-LSH-ben-(k), and k b-LSH-mal-(k) may be equal to m and in certain embodiments the value of m may be equal to 128.

The SM generator 510 may be configured to forward similarity matrices 540 to MLA module 512. The MLA module 512 may be configured to reduce the dimensionality of similarity matrices 540 in a manner that the reduced dimension of similarity matrices 540 retain the required information but reduces noise and redundancy and predicting the unrecognized PE file as a benign file or a malicious file.

Figure 12:
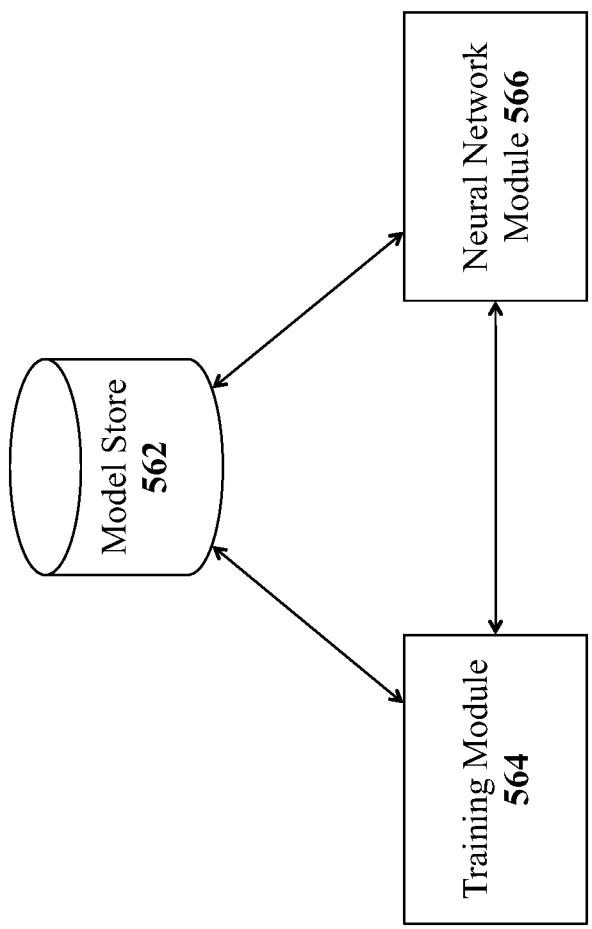
FIG. 12 illustrates a detailed block diagram an MLA module, in accordance with various embodiments of present disclosure.

With this said, FIG. 12 illustrates a detailed block diagram of MLA module 512, in accordance with various embodiments of present disclosure. As shown, MLA module 512 may include a model store 562, a training module 564, and a neural network module 566. It is to be noted that other components may be present but not illustrated for the purposes of tractability and simplicity.

Although, MLA module 512 and the associated components have been illustrated as being included in malicious software detection system 500, in certain embodiments, some of the components of MLA module 512 may be implemented on system 300. By way of example, model store 562 and training module 564 may be implemented on system 300 and the neural network module may be implemented on malicious software detection system 500.

The model store 562 may store trained and/or untrained neural network models or MLAs. The model store 562 may provide the untrained neural network models to training module 564 and provides the trained neural network models or MLAs to the neural network module 566. In one embodiment, a model stored in model store 562 comprises weights of the model and instructions associated with the model, for example, instructions for processing an input and generating the output for the model.

In certain non-limiting embodiments, PE files dataset 302 may include labeled PE files. The labels may represent an expected outcome corresponding to the PE files. For example, PE files dataset 302 may include PE files labeled as a benign file or a malware file.

The training module 564 trains one or more neural network models and/or MLAs using the PE files. In so doing, training module 564 may assess PE files dataset 302. By way of non-limiting example, training module 564 provides an input (e.g., a PE file form the PE files dataset 302) to the neural network model and/or MLA. The neural network model and/or MLA may generate a corresponding output (e.g., a prediction of PE file as a malicious file or a benign file).

The training module 564 may compare the output of the neural network model and/or MLA with the expected label associated with the input to determine a measure of an error in the output. The errors observed in the outputs of various inputs are fed back into the neural network model and/or MLA to adjust the various weights associated with the nodes and the connections of the neural network model and/or MLA. This process is iteratively repeated until a satisfactory performance is obtained. In one non-limiting example, the process of adjusting the weights associated with the nodes may be iteratively repeated until an aggregate metric based on the error is determined to be below a certain threshold value. In other non-limiting examples, the process of adjusting the weights associated with the nodes may be repeated for a predetermined number of iterations, such as, for example, 1000 iterations. The training module 564 repeats the process of training the neural network model through multiple iterations.

In one embodiment, training module 564 may train a convolutional neural network based autoencoder (CNN-AE). However, in other embodiments, other suitable autoencoder techniques may be trained in addition to or in substitution of CNN-AE.

Figure 13:
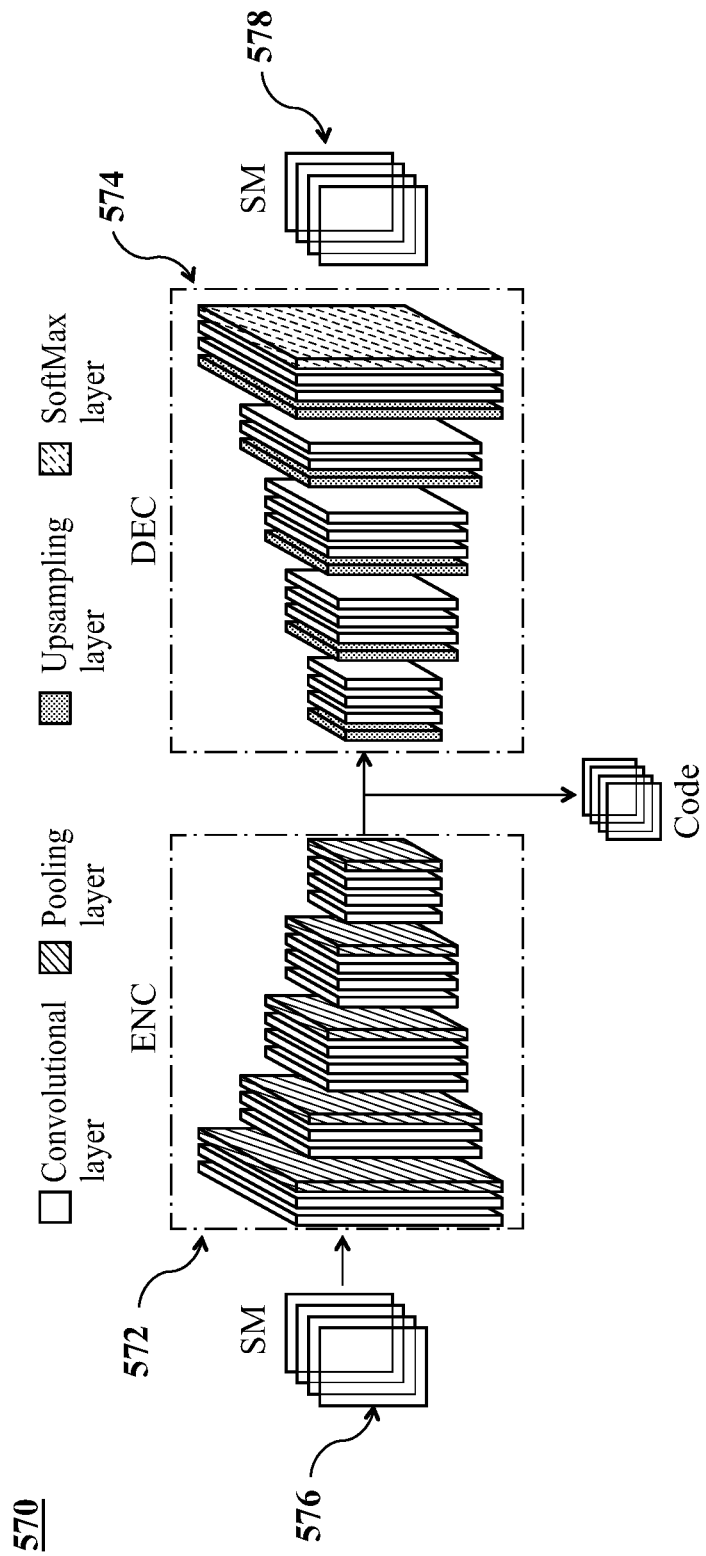
FIG. 13 illustrates a high-level functional diagram of CNN-AE, in accordance with various embodiments of the present disclosure.

FIG. 13 illustrates a high-level functional diagram of CNN-AE 570, in accordance with various embodiments of the present disclosure. As shown, CNN-AE 570 includes an encoder 572 and a decoder 574. The encoder may include two-dimensional convolutional layers and pooling layers. The decoder 574 may include two-dimensional upscaling layers, convolutional layers, softmax layer.

During training phase, encoder 572 of CNN-AE 570 may be fed with similarity matrices 576. It is to be noted that similarity matrices 540, as discussed above, was based on MinHash signatures (binary and assembly language-based) of the unrecognized PE files and k similar MinHash signatures (binary and assembly language-based) of already known PE benign files and PE malware files. However, in certain embodiments, similarity matrices 576 may be based on MinHash signatures (binary and assembly language-based) of the already known PE benign files and/or PE malware files and k similar MinHash signatures (binary and assembly language-based) of other already known PE benign files and PE malware files. The similarity matrices 576 may be created in a similar manner as similarity matrices 540, with the only difference that instead of starting with an unrecognized PE file, a known PE benign file and/or PE malware file may be the initial file and k similar MinHash signatures (binary and assembly language-based) of other know matrices may be used to create similarity matrices 576.

The output of decoder 574 of CNN-AE 570 may be similarity matrices 578. The training module 564 may adjust the weights of CNN-AE 570 until similarity matrices 578 are equal to similarity matrices 576. The CNN-AE 570 may be trained with different similarity matrices. Once similarity matrices 578 are equal to similarity matrices 576, CNN-AE 570 may be considered to as a trained CNN-AE 570 and training module 564 may be configured to forward trained CNN-AE 570 to neural network module 566.

Figure 14:
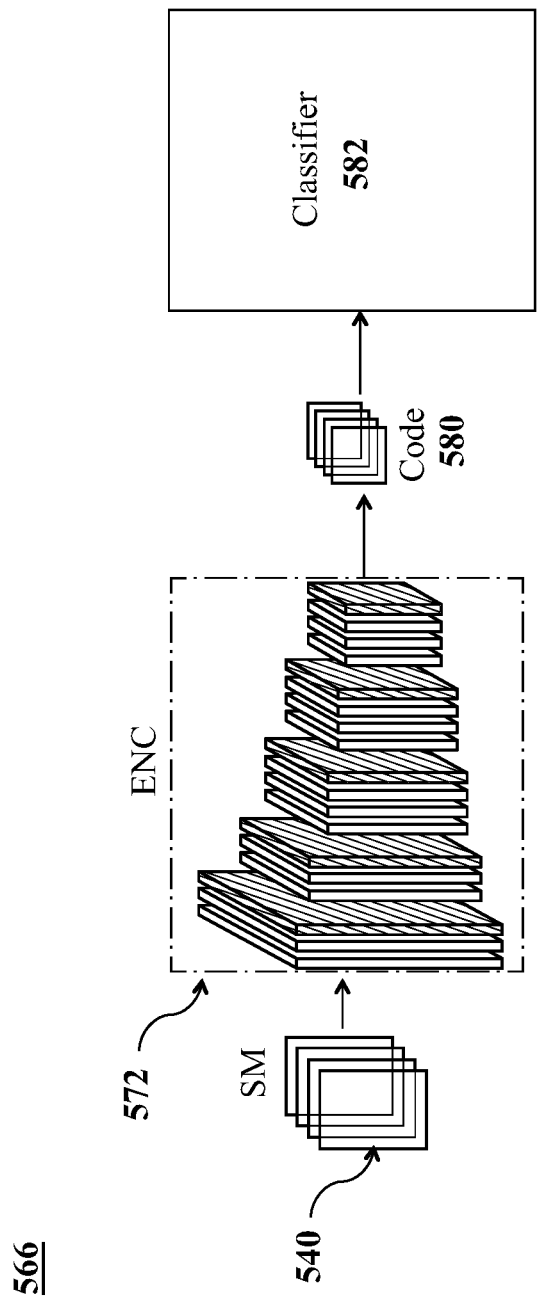
FIG. 14 illustrates an example of components associated with a neural network module, in accordance with various embodiments of the present disclosure.

FIG. 14 illustrates an example of components associated with neural network module 566, in accordance with various embodiments of the present disclosure. As shown, in certain embodiments, neural network 566 may include encoder 572 and a classifier 582. It is to be noted that, in certain embodiments, encoder 572 (a part of CNN-AE 570) may be a software module and the related weights and programing instructions may be provided by training module 564.

Further, classifier 582 may be any machine learning classifier that can operate on the output of encoder 572 may be used. Various embodiments of the present disclosure may use any or all such machine learning classifiers. Examples include but are not limited to (i) linear classifiers, e.g., logistic regression classifiers, and naïve Bayes classifiers, (ii) support vector machines (SVMs), (iii) decision trees, (iv) boosted trees, (v) random forest classifiers, (vi) neural networks, and (vii) nearest neighbor classifiers, to name a few.

With this said, the SM generator 510 (as shown in FIG. 9) may forward similarity matrices 540 (as shown in FIG. 11) to encoder 572. The encoder 572 may convert similarity matrices 540 into a lower dimensionality code representation 580 of the unrecognized PE file. The classifier 582 may be configured to operate on lower dimensionality code representation 580 and classify the unrecognized PE file as a PE benign file or a PE malware file.

It is to be noted that one application of encoder 572 is dimensionality reduction which means transformation of data from a high-dimensional space into a low-dimensional space. The encoder 572 may accept the input data, compress it down to the latent-space representation (encoding), and then attempt to reconstruct the input using just the latent-space vector. Typically, the latent-space representation will have much fewer dimensions than the original input data and is represented as lower dimensionality code representation 580.

In certain embodiments, if the unrecognized PE file is classified as PE malware file, in response, malicious software detection system 500 may be configured to generate (e.g., produce, create, report, or otherwise bring about or settle upon or the like) a remedial action. The remedial action may include but is not limited to removing, deleting, erasing or the like the unrecognized PE file from electronic device 110. Other non-limiting examples of remedial action may include quarantining, isolating, confining, restraining or the like the unrecognized PE file.

Without any losing any generality, as an example, FIG. 15 illustrates a 2D CNN-AE architecture 600 for k=10, m=128 similarity matrices, in accordance with various embodiments of present disclosure. The architecture example 600 in FIG. 15 may be used to train on a sample set that consists of 298545 malwares and 233821 benign PE files. The 2D CNN-AE architecture 600 with similarity matrices representations achieved test performance of TPR=98.97% with FPR=4.65% at threshold 0.5.

Further, the performance of 2D CNN-AE architecture 600 is compared with a Deep Neural Network (DNN) model-based architecture 610 as illustrated in the FIG. 16, in accordance with various embodiments of the present disclosure. The 2D DNN architecture 610 without similarity matrices representations achieved test performance of TPR=84.30% with FPR=15.69%.

Table. I represents performance comparison between the SM representation with 2D CNN-AE architecture and regular Assembly and Binary MinHash representation with DNN-MLP architecture.

TABLE I

| Representation | Architecture | TPR (%) | FPR (%) | Accuracy (%) | ROC-AUC (%) |
|---|---|---|---|---|---|
| a-MinHash + b-MinHash | DNN-MLP | 84.30 | 15.69 | 84.30 | 91.44 |
| SM (k = 10) | 2D CNN | 98.97 | 4.65 | 96.93 | 98.73 |

With this said, malicious software detection system 500 differentiate between PE benign files and PE malware files with the SM representation that is immune to obfuscation. Further, malicious software detection system 500 harnesses the SM representation and present factorized feature set that enable CNN-AE based neural network module 566 to predict maliciousness with high TPR rate and low FPR.

The malicious software detection system 500 may be continuously evolving by updating the CNN-AE based neural network module 566 and enriching the MinHash LSH forest using more PE benign files and PE malware files samples. Moreover, the SM representation accuracy may be improved by incorporating more resources through increasing of MinHash length m and the similarity hashes set k. Thus, by virtue of malicious software detection system 500 capabilities of computer systems such as, client device 110 and/or server 114 may be significantly improved to detect malicious PE files.

FIG. 17 depicts a flowchart representing a process 700 corresponding to a malicious software detection method implemented on the malicious software detection system 500, in accordance with various embodiments of the present disclosure. As shown, process 700 begins at step 702 where malicious software detection system 500 recognizes an unrecognized portable executable (PE) file. As noted above, PE file recognizer 502 may be configured to recognize an unrecognized PE file.

The process 700 advances to step 704, where malicious software detection system 500 extracts an entry point (EP) section in the unrecognized PE file and collects bytes in the EP section of the unrecognized PE file. As discussed above, feature extractor 504 may be configured to extract an EP section in the detected unrecognized PE file and collect all the raw bytes in the EP section of the unrecognized PE file.

The process 700 proceeds to step 706, where malicious software detection system 500 converts the bytes in the EP section to an array of integers. As discussed above, feature extractor 504 may convert the raw bytes in the EP section to integer numbers representing an array of integers.

The process 700 moves to step 708, where malicious software detection system 500 generates one or more n-grams from the array of integers, where n is an integer number and converting the one or more n-grams into binary m-MinHash signatures represented as b-MinHash, m is an integer number representing the number of MinHash signatures. As previously discussed, MinHash representation module 506 may be configured to generate one or more n-grams such as 1-gram, bi-gram, and tri-gram (shingles) from the array of integers related to the unrecognized PE file. Also, MinHash representation module 506 may be configured to convert 1-gram, bi-gram, and tri-gram (shingles) of the array of integers related to the unrecognized PE file into binary m-MinHash signatures.

The process advances to step 710, where malicious software detection system 500 converts the bytes in an EP function included in the EP section to an array of assembly-based mnemonics. As discussed above, feature extractor 504 may convert the raw bytes in an EP function included in the EP section to an array of assembly language-based mnemonics.

The process proceeds to step 712, where malicious software detection system 500 generates one or more n-grams from the array of assembly language-based mnemonics and converting the one or more n-grams from the array of assembly language-based mnemonics into assembly m-MinHash signatures represented as a-MinHash. As noted above, MinHash representation module 506 may be configured to generate one or more n-grams such as 1-gram, bi-gram, and tri-gram (shingles) from the array of assembly language-based mnemonics. Also, MinHash representation module 506 may be configured to convert 1-gram, bi-gram, and tri-gram (shingles) of the array of assembly language-based mnemonics related to the unrecognized PE file into assembly m-MinHash signatures.

The process advances to step 714, where malicious software detection system 500 fetches first and second k MinHash signatures similar to the b-MinHash from a first and a second locality sensitive hashing (LSH) forest model respectively. As discussed previously, SM generator 510 may be configured to fetch k binary MinHash signatures similar to the b-MinHash from first LSH forest model dataset 508a. Also, SM generator 510 may be configured to fetch k binary MinHash signatures similar to the b-MinHash from third LSH forest model dataset 508c.

The process moves to step 716, where malicious software detection system 500 fetches third and fourth k MinHash signatures similar to the a-MinHash from a third and a fourth LSH forest model respectively. As discussed previously, SM generator 510 may be configured to fetch k binary MinHash signatures similar to the a-MinHash from second LSH forest model dataset 508b. Also, SM generator 510 may be configured to fetch k binary MinHash signatures similar to the b-MinHash from fourth LSH forest model dataset 508d. The first, second, third, and fourth k MinHash signatures as similarity matrices.

Finally, at step 718, where malicious software detection system 500 converts, with a neural network model, the similarity matrices into a lower dimensionality code representation and classifying the lower dimensionality code representation as a PE benign file or a PE malware file. As noted above, encoder 572 associated with CNN-AE 572 may convert similarity matrices 540 into a lower dimensionality code representation 580 of the unrecognized PE file and classifier 582 may be configured to operate on lower dimensionality code representation 580, classify the unrecognized PE file as a PE benign file or a PE malware file and generate a remedial action in response to classifying the lower dimensionality code representation as the PE malware file.

It is to be understood that the operations and functionality of environment 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for malicious software detection comprising:
   recognizing an unrecognized portable executable (PE) file;
   extracting an entry point (EP) section in the unrecognized PE file that contains address information where the programming instructions of a PE file starts and ends;
   collecting bytes in the EP section of the unrecognized PE file;
   converting the bytes in the EP section to an array of integers;
   generating one or more n-grams from the array of integers, where n is an integer number and converting the one or more n-grams into binary m-MinHash signatures represented as b-MinHash, m is an integer number representing the number of MinHash signatures;
   converting the bytes in an EP function included in the EP section to an array of assembly-based mnemonics;
   generating one or more n-grams from the array of assembly-based mnemonics and converting the one or more n-grams from the array of assembly-based mnemonics into assembly m-MinHash signatures represented as a-MinHash;
   fetching first k MinHash signatures similar to the b-MinHash from a first locality sensitive hashing (LSH) forest model;
   fetching second k MinHash signatures similar to the b-MinHash from a second LSH forest model;
   fetching third k MinHash signatures similar to the a-MinHash from a third LSH forest model;
   fetching fourth k MinHash signatures similar to the a-MinHash from a fourth LSH forest model;
   representing the first, second, third, and fourth k MinHash signatures as similarity matrices;
   converting, with a neural network model, the similarity matrices into a lower dimensionality code representation;
   classifying the lower dimensionality code representation as one of a PE benign file and a PE malware file; and
   generating a remedial action in response to classifying the lower dimensionality code representation as the PE malware file.

2. The method of claim 1, wherein converting the bytes in the EP section as the array of integers includes truncating or zero-padding the array of integers to a fixed length array.

3. The method of claim 1, wherein the first LSH forest model is generated for known PE benign files using binary m-MinHash signatures related to the known PE benign files.

4. The method of claim 1, wherein the second LSH forest model is generated for known PE malware files using binary m-MinHash signatures related to the known PE malware files.

5. The method of claim 1, wherein the third LSH forest model is generated for known PE benign files using assembly m-MinHash signatures related to the known PE benign files.

6. The method of claim 1, wherein the fourth LSH forest model is generated for known PE malware files using assembly m-MinHash signatures related to the known PE malware files.

7. The method of claim 1, wherein the neural network model is a convolutional neural network autoencoder.

8. The method of claim 1, wherein the neural network model is trained using the known PE benign files and known PE malware files.

9. The method of claim 1, wherein the remedial action is removing the PE malware file from the electronic device.

10. The method of claim 1, wherein the remedial action is quarantining the PE malware file.

11. A system for malicious software detection comprising:
at least one processor; and at least one memory including program code which when executed by the at least one memory provides operations comprising:
recognizing an unrecognized portable executable (PE);
extracting an entry point (EP) section in the unrecognized PE file that contains address information where the programming instructions of a PE file starts and ends;
collecting bytes in the EP section of the unrecognized PE file;
converting the bytes in the EP section to an array of integers;
generating one or more n-grams from the array of integers, where n is an integer number and converting the one or more n-grams into binary m-MinHash signatures represented as b-MinHash, m is an integer number representing the number of MinHash signatures;
converting the bytes in an EP function included in the EP section to an array of assembly-based mnemonics;
generating one or more n-grams from the array of assembly-based mnemonics and converting the one or more n-grams from the array of assembly-based mnemonics into assembly m-MinHash signatures represented as a-MinHash;
fetching first k MinHash signatures similar to the b-MinHash from a first locality sensitive hashing (LSH) forest model;
fetching second k MinHash signatures similar to the b-MinHash from a second LSH forest model;
fetching third k MinHash signatures similar to the a-MinHash from a third LSH forest model;
fetching fourth k MinHash signatures similar to the a-MinHash from a fourth LSH forest model;
representing the first, second, third, and fourth k MinHash signatures as similarity matrices;
converting, with a neural network model, the similarity matrices into a lower dimensionality code representation;
classifying the lower dimensionality code representation as one of a PE benign file and a PE malware file; and
generating a remedial action in response to classifying the lower dimensionality code representation as the PE malware file.

12. The system of claim 11, wherein converting the bytes in the EP section as the array of integers includes truncating or zero-padding the array of integers to a fixed length array.

13. The system of claim 11, wherein the first LSH forest model is generated for known PE benign files using binary m-MinHash signatures related to the known PE benign files.

14. The system of claim 11, wherein the second LSH forest model is generated for known PE malware files using binary m-MinHash signatures related to the known PE malware files.

15. The system of claim 11, wherein the third LSH forest model is generated for known PE benign files using assembly m-MinHash signatures related to the known PE benign files.

16. The system of claim 11, wherein the fourth LSH forest model is generated for known PE malware files using assembly m-MinHash signatures related to the known PE malware files.

17. The system of claim 11, wherein the neural network model is a convolutional neural network autoencoder.

18. The system of claim 11, wherein the neural network model is trained using the known PE benign files and known PE malware files.

19. The system of claim 11, wherein the remedial action is removing the PE malware file from the electronic device.

20. The system of claim 11, wherein the remedial action is quarantining the PE malware file.

* * * * *

UNITED STATES PATENT AND TRADEMARK OFFICE
CERTIFICATE OF CORRECTION

PATENT NO.        : 11,574,054 B2
APPLICATION NO.   : 17/093882
DATED             : February 7, 2023
INVENTOR(S)       : Ibrahim Yakub Abu Alhaol et al.

Page 1 of 1

It is certified that error appears in the above-identified patent and that said Letters Patent is hereby corrected as shown below:

On the Title Page

In Item (56) REFERENCES CITED:
The first US reference should read: --8,955,120--

Signed and Sealed this
Twenty-third Day of May, 2023

*Katherine Kelly Vidal*

Katherine Kelly Vidal
*Director of the United States Patent and Trademark Office*